United States Patent [19]

Cowell et al.

[11] Patent Number: 5,329,085
[45] Date of Patent: Jul. 12, 1994

[54] TEMPERATURE SELF REGULATING HEATERS AND SOLDERING IRONS

[75] Inventors: Mark J. Cowell, San Carlos; Steven A. Daniel, Fremont, both of Calif.

[73] Assignee: Metcal, Inc., Menlo Park, Calif.

[21] Appl. No.: 925,029

[22] Filed: Aug. 5, 1992

[51] Int. Cl.⁵ ............................................. H05B 6/14
[52] U.S. Cl. .................................. 219/616; 219/229; 219/236; 219/238; 219/660; 219/635; 219/676
[58] Field of Search ............... 219/10.75, 10.77, 10.41, 219/10.43, 227, 229, 230, 233–241, 9.5, 10.491, 85.11, 10.79

[56] References Cited

U.S. PATENT DOCUMENTS

| | | |
|---|---|---|
| 1,975,436 | 10/1934 | Sorrel et al. |
| 2,912,553 | 11/1959 | Tudbury |
| 2,951,927 | 9/1960 | Weller ............................ 219/241 |
| 3,218,384 | 11/1965 | Shaw |
| 3,296,364 | 1/1967 | Mason |
| 3,691,342 | 9/1972 | Giles et al. |
| 4,086,465 | 4/1978 | Sylvester |
| 4,091,813 | 5/1978 | Shaw et al. |
| 4,185,632 | 1/1980 | Shaw |
| 4,256,945 | 3/1981 | Carter et al. |
| 4,431,903 | 2/1984 | Riccio |
| 4,456,186 | 6/1984 | Ando |
| 4,695,713 | 9/1987 | Krumme |
| 4,701,587 | 10/1987 | Carter et al. |
| 4,745,264 | 5/1988 | Carter |
| 4,752,673 | 6/1988 | Krumme |
| 4,839,501 | 6/1989 | Cowell |
| 5,047,025 | 9/1991 | Taylor et al. |
| 5,061,835 | 10/1991 | Iguchi ............................ 219/10.79 |
| 5,087,256 | 2/1992 | Taylor et al. |
| 5,143,272 | 9/1992 | Carlomagno et al. ............ 228/20 |

OTHER PUBLICATIONS

"New Method of Preventing Ice Formation on Exposed Power Conductors", Proc. IEEE, vol. 112, No. 11, Nov. 1965, p. 2125.

Primary Examiner—Philip H. Leung
Assistant Examiner—Gregory L. Mills
Attorney, Agent, or Firm—Howard L. Rose

[57] ABSTRACT

A Curie point heater primarily for use in a soldering iron and initially designed to operate with currents in the megahertz range is restructured to operate in the kilohertz range. Further in one embodiment of the heater, the coil exciting the heater is mounted in the handle of the iron.

15 Claims, 3 Drawing Sheets

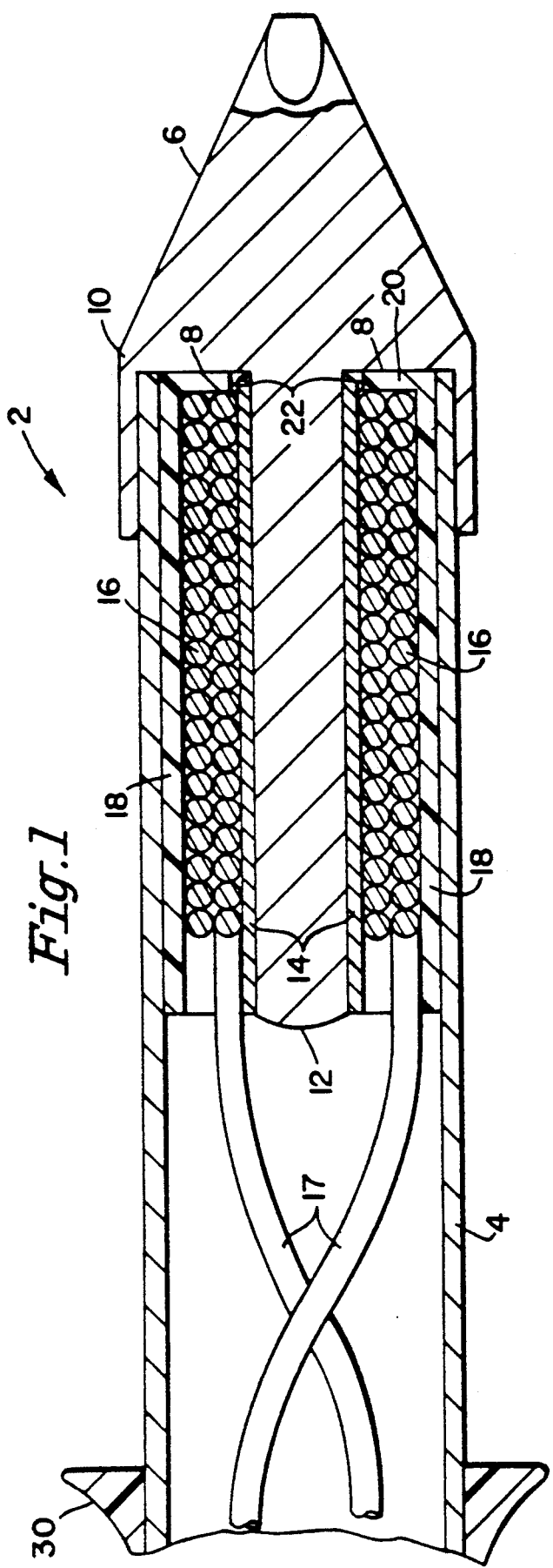
Fig.1
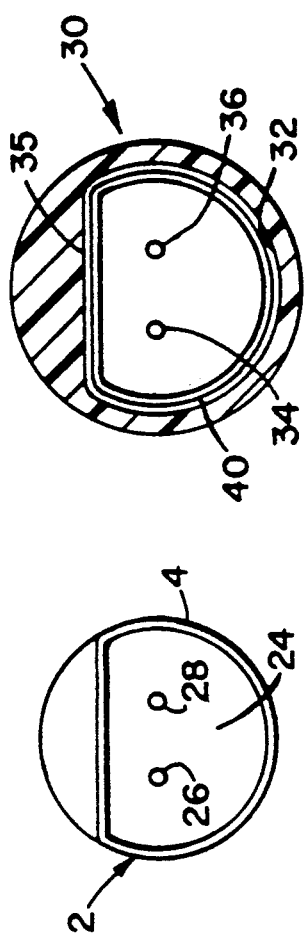
Fig.3
Fig.2

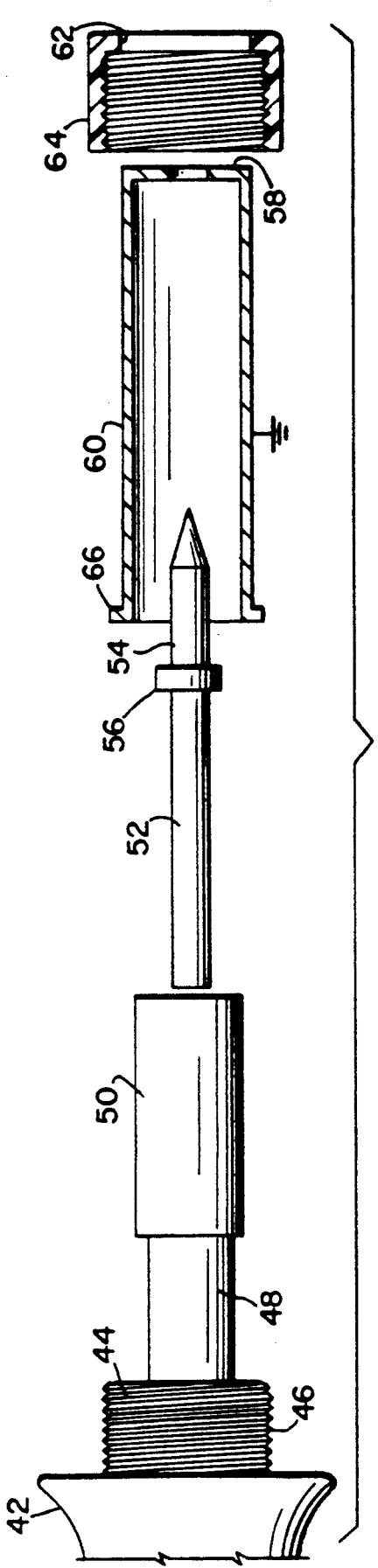
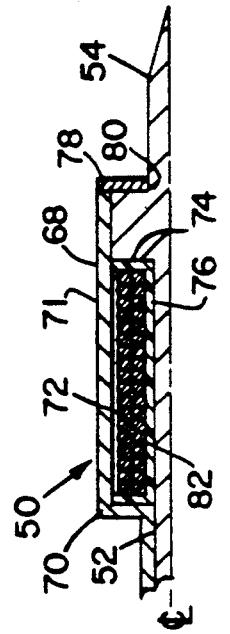
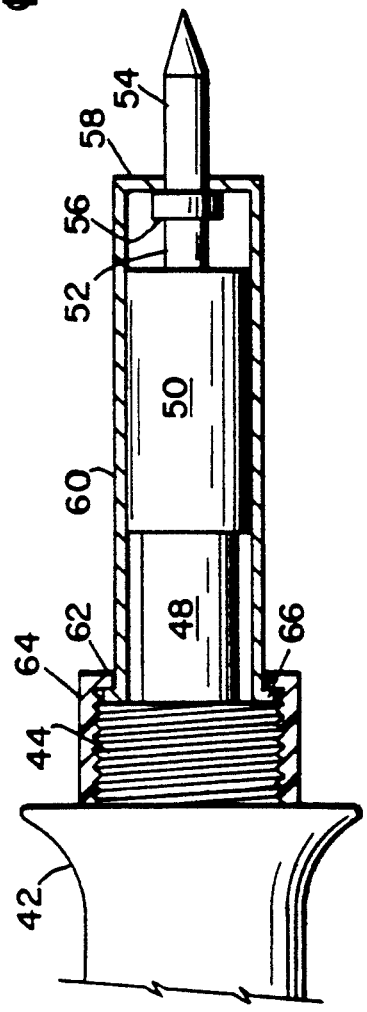
Fig.6
Fig.8
Fig.7

TEMPERATURE SELF REGULATING HEATERS AND SOLDERING IRONS

TECHNICAL FIELD OF THE INVENTION

The present invention relates to Curie point self-regulating heaters and more particularly to temperature self-regulating, Curie point controlled soldering irons and the method of converting existing designs of such irons for operation at frequencies lower than those previously employed for such devices.

BACKGROUND OF THE INVENTION

There is disclosed in U.S. Pat. No. 4,745,264, assigned to the same assignee as the present invention, a Curie point self-regulating soldering iron employing a constant current supply to a coil that is flux coupled to a high mu material forming a layer on a copper rod extending rearwardly from the tip of the iron. The commercial embodiment of the constant current supply operates at 13.56 megahertz and is quite expensive.

As disclosed in the aforesaid patent and U.S. Pat. No. 4,839,501, of one of the present inventors, the soldering iron under discussion is comprised of a handle and a cartridge insertable into the handle. The cartridge essentially comprises the heater structure including the coil, the high mu material and the tip of the iron. Electrical connection between the cartridge and a cable coming into the handle from the power supply is made upon insertion of the cartridge into the handle.

The cartridges are also expensive but the use of insertable cartridges is justified to permit interchange of cartridges that operate at different temperatures as well as providing different tip faces. Specifically the temperature at which a cartridge self-regulates is a function of the high permeability material employed.

OBJECTS OF THE INVENTION

It is an object of the present invention to provide a Curie point self-regulating heater that is as efficient as the iron of the aforesaid patent but is structured to operate with a lower frequency, less expensive power supply.

It is yet another object of the present invention to provide a Curie point self-regulating heater that operates efficiently in the 100 KHz to 1 MHz range.

It is still another object of the present invention to reduce the cost of the soldering iron cartridges of the present invention.

It is another object of the invention to reduce the overall costs of a soldering iron system employing Curie point, temperature self regulating heaters.

BRIEF DESCRIPTION OF THE PRESENT INVENTION

In accordance with one aspect of the present invention the frequency of the power supply is reduced to reduce its cost. Specifically the supply frequency is reduced to a frequency that permits the development of an efficient soldering iron for use with the lower frequency supply.

With the frequency of the supply lowered one obvious change to the soldering iron cartridge must be made. Other changes are not obvious and these are the primary concern of the present invention.

The one obvious change required by the lower supply frequency is the skin depth of the high mu material. A self-regulating heater employing Curie point regulation relies on the fact that as a result of skin effect, current is concentrated in the skin of a conductor. In the heaters represented by the patents cited above, a coating or layer of high impedance, high mu material is applied to a good current conductor. Below Curie temperature the majority of the current is confined to 2.5 to 3.5 skin depths of the exterior of the conductor. Skin depth is defined by the equation:

$$S.D. = 5030 \sqrt{\frac{\rho}{\mu f}} \text{ cm}$$

where $\rho$ is the resistivity of the high mu material, $\mu$ is the permeability of the high mu material and f is frequency. If, for example, the frequency of the current is reduced from 13.56 MHz to 435 KHz the skin depth increases by 5.583 times. In the heaters of the present invention a skin depth of high mu material of 2.5 to 3.5 is used to insure that below the Curie temperature of the material a large majority of the current is confined to the high resistance material insuring rapid heating. When the temperature of the high mu material approaches its effective Curie temperature the permeability of the material approaches one and since $P = I^2R$ and I is a constant and R is reduced as the current spreads into the low resistance material, the rate of heating of the device is reduced. As a result of the change in permeability, the temperature falls below the effective Curie temperature and the cycle repeats.

The term "constant current" where used herein relates to a current that follows the equation $$\frac{\Delta I}{I} < -\frac{1}{2}\frac{\Delta R}{R}$$

where I and R are the current in the coil and resistance of the heater, respectively.

The term "effective Curie temperature" recognizes that at some temperature below absolute Curie temperature, from 1° C. to 100° C. depending on the material, the rate of heating is reduced sufficiently that temperature of the heater stabilizes below Curie temperature. The high permeability materials may be ferromagnetic, ferrimagnetic or any other material, the magnetic permeability of which decreases with temperature. Hereinafter the term "ferromagnetic" is employed to encompass all such materials.

The reduction of frequency produces numerous problems which are not solved by the simple expedient of increasing the thickness of the ferromagnetic layer, to approximately 0.005–0.007 inch at 470 KHz with a permeability of approximately 250. A heater in which only the skin depth is changed relative to that of the aforesaid U.S. Pat. No. 4,745,264 does not produce the optimum results obtainable.

A first problem noted is the reduction of resistance of the heater. It has been determined that at the lower frequency, the resistance of the heater is lower than at the higher frequencies. Specifically, $$R = \rho \frac{L}{A}$$

where R is resistance and A is area of the ferromagnetic. Since A increases, R decreases. Thus the requisite heating is not achieved. In accordance with the present invention this problem has been overcome by increasing the number of turns of the coil that energizes the heater and increasing the amplitude of the current by about 1.4 times. The number of turns of the coil has been doubled to 18-22 turns per layer thereby quadrupling the resistance that would have been present under the original design.

Heating at the tip would not be adequate even with the above modifications. As a result of lengthening of the coil and thus the length of the coated rod extending rearwardly from the tip into the coil, there was insufficient heat flow from the distal end of the rod to the tip. Stated another way, the impedance to flow of heat from the more remote regions of the heater did not add sufficiently to the heat from the proximal end of the heater to achieve proper temperature response. It has been determined that by increasing the diameter of the rod (the cross-sectional area) the resistance to flow of heat from the distal end of the rod to the tip of the device was decreased sufficiently to obtain the desired self-regulating response.

An additional feature of the present invention where the coil is a permanent part of the cartridge is to provide a sleeve of ferromagnetic material having a Curie point well above that of the heater about the coil. The radial distance between the heater and the coil should be much less than the radial distance between the coil and the sleeve. The sleeve has a generally closed end with a hole to receive the rod extending rearwardly from the tip. The sleeve is positioned over the coil with the outer surface of the generally closed end in contact with the rear part of the tip and the inner surface of the closed end in contact with the proximal end of the coil windings. This arrangement permits the coil to be placed virtually in contact with the rear of the tip while preventing coupling of the magnetic field to the lower resistance of the low resistance material such as copper.

In a further embodiment of the invention, the cost of the cartridge is reduced by making the coil and the member 18 of FIG. 1, a permanent part of the handle so that the cartridge carries only the heater, the tip, a ground connection and a shaft. The heater, when the cartridge is inserted in the handle, is positioned immediately adjacent the coil with protective surfaces of the coil and heater in contact with one another to maintain the spacing between coil and heater as small as possible.

The cost of the cartridges is greatly reduced by this procedure. The cost of the handle is increased slightly but it is not replaced very often whereas the replacement costs of a full complement of tips used on a regular basis is markedly reduced.

The above and other features, objects and advantages of the present invention, together with the best means contemplated by the inventors thereof for carrying out their invention will become more apparent from reading the following description of a preferred embodiment and perusing the associated drawings in which:

BRIEF DESCRIPTION OF THE DRAWINGS

FIG. 1 is a side view in cross section of an embodiment of a cartridge of the present invention;

FIG. 2 is an end of the cartridge of the invention;

FIG. 3 is a view in cross section of a part of a handle for the cartridge of FIG. 1;

FIG. 6 is an exploded side view of another embodiment of the present invention;

FIG. 7 is an enlarged view in cross section of the coil and adjacent region of the present invention; and FIG. 8 is a partial view of the coil arrangement of FIG. 6.

DETAILED DESCRIPTION OF THE PRESENT INVENTION

Figure 4:
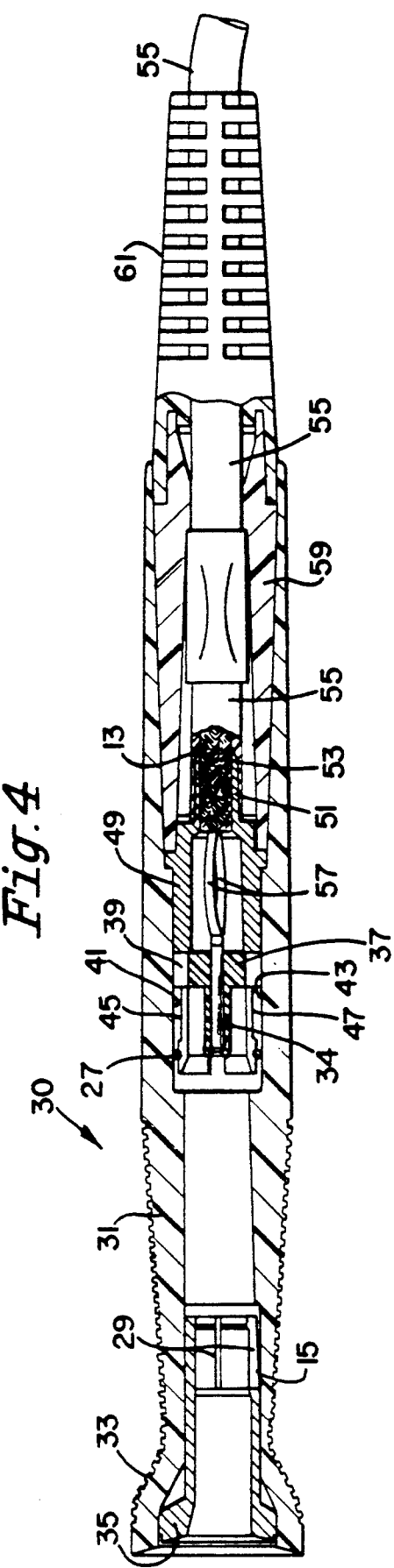
FIG. 4 is a view in cross section of a handle for the cartridge of FIG. 1.

Referring specifically to FIG. 1 of the accompanying drawings there is illustrated in cross section, a soldering iron heater cartridge 2 in accordance with one embodiment of the present invention. An outer cylindrical sleeve 4 which may be of non-magnetic, low heat conductive stainless steel, encloses the components of the iron rearwardly of the tip 6 of the iron. The tip 6 of the iron, which is preferably copper, is a conic and has a rear wall 8 against which the sleeve 4 is seated. An annular skirt 10 extends away from the tip 6 from the outer reaches of the wall 8 surrounding the end region of the sleeve 4. A cylindrical rod 12 having a coating thereon of a ferromagnetic material 14 is inserted into a bore 11 in the rear (left) surface 8 of the tip. The Curie point of the coating 14 determines the self regulating temperature of the iron.

A coil of wire 16 is wound about the coating 14 providing in the present invention two layers of 18 to 22 turns each. A cylindrical sleeve 18 has an open distal end relative to the tip 6 and an end wall 20 or juxtaposed washer having a centrally located hole 22 for the rod 12 to pass through. The end wall 20 is seated against the wall 8 and the coil 16 is positioned as close to the end wall 20 as possible. Thus the coil 16 is firmly held in place and is close to the wall 8 and thus tip 6 as the dimensions of the end wall 20 permits.

The sleeve 18 and end wall 20, which may or may not be a single piece, are fabricated from a ferromagnetic material having a Curie temperature sufficiently above that of the ferromagnetic material 14 that it maintains its high permeability over the operating temperature range of the iron. The sleeve helps concentrate the flux produced by the coil in the layer 14 and at the same time prevents coupling of flux to the tip and reduces leakage of flux into surrounding regions.

As previously indicated the problems of converting the iron from one operating at 13.56 MHz or generally in the 5 to 20 MHz range to one operating in the 100 KHz to 5 MHz range were many. The one obvious change assuming a 470 KHz supply was to increase the thickness of the layer 14 to that which is 5.3 times ($\sqrt{13.56/0.47}$) the skin depth of the old iron at the new frequency, specifically 0.005-0.007 inches in this case. It is known that at one skin depth 63.2% of the current is confined in the ferromagnetic layer and at 1.8 skin depths over 80% of the current is confined to the ferromagnetic material. Thus the vast majority of current is confined to a region of high resistance, for Alloy 42 a resistivity of about $75 \times 10^{-6}$ ohm-cm and a mu of about 250. When the ferromagnetic becomes non-magnetic, from the skin depth equation, one skin depth is increased by a factor of approximately 16 (the $\sqrt{250}$) so that the majority of the current now flows in copper a resistivity of approximately $2 \times 10^{-6}$. Thus the heating effect is materially reduced.

It was found, however, that performance of the iron with such a change was still poor. It was initially determined that increasing the thickness of the ferromagnetic layer reduced the effective resistance of the ferromagnetic layer to unacceptable levels. In order to increase the resistance of the heater, the number of turns of the coil 16 is increased, doubled with a 470 KHz supply to the range of 18 to 22 turns per layer. The wires of the coil 16 and the twisted pair 17 connect to a connector supported in sleeve 4 at its end remote from the coil. The current is increased from 0.7 amps in the prior iron to 1 amp in the present iron.

The performance of the iron was still not satisfactory; the self regulation extending over too wide a temperature range with the potential of poor performance. It was determined that the lengthening of the rod 12 to accommodate the increased number of turns of the coil 16 introduced sufficient thermal resistance into the structure that the heat generated at the distal end of the heater did not contribute sufficiently to the heat at the tip to provide the necessary response to changing load conditions. The problem is solved by increasing the cross-sectional area of the rod 12 (the diameter of the rod in this instance) to reduce its thermal resistance and permit relatively rapid response of the heater at the distal end of the heater to assist in temperature control.

Thus conversion of the iron from one operating at 13.56 MHz to one operating at a substantially lower frequency comprises the steps of increasing the thickness of the ferromagnetic layer of the heater, increasing the number of turns of the coil and the current (from 0.7A to 1A) exciting the heater and increasing the diameter of the heater, specifically the rod 12 and ferromagnetic layer 14. An additional feature is the use of the sleeve 18 with end wall or washer to permit the coil 16 to be securely positioned closely adjacent tip 6, specifically wall 8.

The end of the sleeve 4 remote from the tip is formed into a general D-shape as illustrated in the end view of FIG. 2. Held within the sleeve 4 is a two pin connector 24 having pins 26 and 28 connected to the ends of the twisted pair 17. Handle 30 has an inside configuration to snugly receive soldering iron heater cartridge 2. Specifically handle 30 has D-shaped cavity 32 so as to guide the pins 26 and 28 into female contacts 34 and 36, respectively, of a female receptacle defined more fully in accompanying FIG. 4. Outer member 40 of the handle is conductive and makes electrical contact with the sleeve 4 when the cartridge is inserted into the handle. The member 40 is connected to power line supply ground back through the power supply for the iron whereby the sleeve is maintained at power line ground potential. Such connections insure against electric shock of the operator.

The sleeve 4 extends sufficiently beyond handle 30 so that the sleeve is relatively cool immediately adjacent the handle although direct contact with the skin is not recommended.

Referring now specifically to FIG. 4 of the accompanying drawings, there is illustrated the handle 30 of the present invention. The handle consists of a generally cylindrical outer, plastic shell 31 flared at its left end as viewed in FIG. 4 to provide a hollow, conical grip 33. A conductive insert 35 is force-fitted into the hollow end of shell 31 to define the D-shape employed to align the male connector pins 26 and 28 of the cartridge with the female counterparts 34 and 36 in the handle. A split ring 15 of resilient metal is slotted at 29 so that the ring tightly holds the cartridge.

Figure 5:
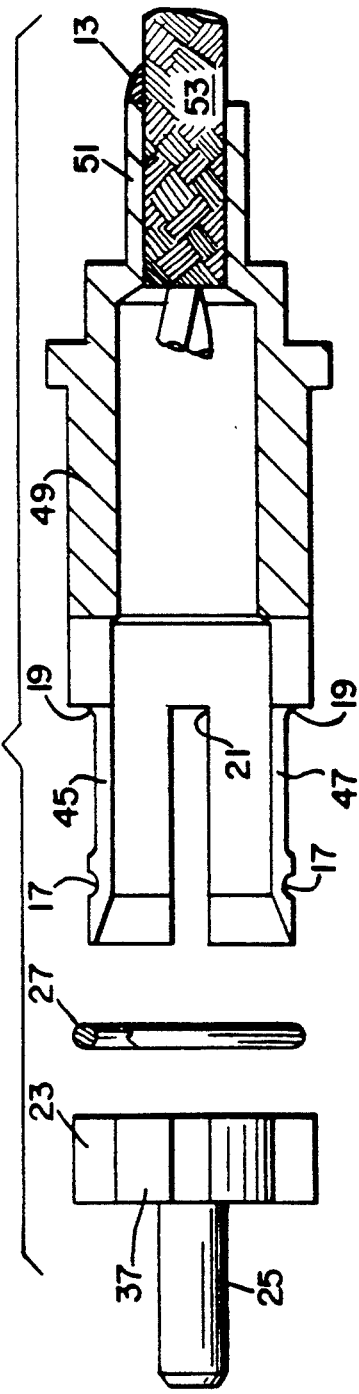
FIG. 5 is a detailed view of elements of the handle 30 of FIG. 4.

Referring to FIG. 5, a hollow brass member 49, is slotted at four places 21, only one of which is illustrated, to provide a plurality of spring fingers 45 and 47 which receive a female receptacle 37 containing female contacts 34 and 36. The receptacle has an outwardly extending shoulder 25 at its right side as viewed in FIG. 5; the shoulder being slotted at 23 to be aligned with slots 21 in member 49 so that the spring fingers 45, 47, etc. surround the receptacle 37. A resilient wire ring 27 is snapped over the fingers 45, 47, etc., seats in recesses 17 and presses the fingers against the receptacle 37 to hold it in place. Resiliency is imparted to the fingers 45, 47, etc. by reducing the diameter of each finger at 19 in each finger.

All of the metallic elements of the handle are made of brass.

The slots 21 are arranged relative to the D-shaped member 35 to insure proper alignment of the male and female members of the electrical connector. The spring fingers 45, 47, etc. contact the outer sleeve 4 of the cartridge. The right end, as viewed in FIG. 4, of the hollow cylinder 49 terminates in a region 51 of reduced diameter that is connected to braid 53 of a cable 55 by conductor 13 which braid is connected to a power supply for the iron to provide a ground return. A twisted pair 57 of the cable 55 has each lead connected to a different one of the female members 34 and 36 to complete the electrical circuit.

All of the members related to the female receptacle located in the handle are force fitted into it from the right as viewed in FIG. 4 and are further retained by an insert 59, also force fitted into the handle. A standard cable stress relief member 61 is also held in the end of the handle by the insert 59.

Referring now to FIGS. 6, 7 and 8 of the accompanying drawings there is illustrated an alternative arrangement of a handle and cartridge for use in the iron of the present invention. In this arrangement the coil is included in the handle rather than in the cartridge. Handle 42 has a cylindrical extension 44 which may be metal or plastic and has screw threads 46 formed on its outer surface. A hollow shaft 48 of stainless steel extends from the handle 42 and extension 44 and has an enlarged cylinder 50 secured to its distal end. A coil 72 (FIG. 6) is resident in the enlarged cylinder, electrical connections being made by wires extending through the shaft 48, extension 44 and handle 42 to a cable, not illustrated, from an appropriate power supply.

A replaceable tip 52 is insertable into the hollow shaft 48 with the ferromagnetic layer of the heater positioned axially of and generally coextensive with the coil enclosed within member 50.

The end of the cartridge behind tip 54 has a circular outwardly extending circumferential skirt 56 adapted to be engaged by an apertured end wall 58 of a hollow cylindrical retaining sleeve 60. The sleeve 60 is considered a part of the handle and is not replaced with the cartridge. The sleeve fits over the members 44, 48, 50 and 52 with the end wall 58 contacting the skirt 56. The sleeve 60 has an outwardly extending circular shoulder 66 adapted to seat against member 44 and to be engaged by apertured end wall 62 of a nut 64. The nut is internally threaded and is to be threaded onto extension 44 engaging shoulder 66 and holding sleeve 60 against extension 44.

Looking only at the regions of the handle and cartridge relating to the coil and heater, reference is made to FIG. 8. Outer wall 68 of the coil region 50 of the shaft 48 has a radially enlarged wall 70 to provide a region 71 with an open end in which a coil 72 is to be inserted. The coil 72 is wound on a bobbin 76, two or more layers deep depending upon system design. The bobbin 76 is glued or otherwise secured in the region 71 and an end wall 78 secured across the right end of the region 71 to seal it. The end wall has a centrally located hole 80 to receive the cartridge 52.

The cartridge 52 has a layer 82 of ferromagnetic material on the copper rod 52 from which tip 54 extends. The inner wall of the bobbin 76 is about 10 mils thick to insure good coupling to the layer 82 and provides electrical insulation between the coil and the layer 82. The shaft 48 in this embodiment of the invention is fabricated from a 400 series stainless steel, is thus ferromagnetic and provides the same function as the sleeve 18 of FIG. 1. In FIG. 1 the sleeve 4 is fabricated from a 300 series stainless steel which is not ferromagnetic. The sleeve 60 is non-magnetic and thus serves the function of sleeve 4 of FIG. 1.

Numerous modifications can be made particularly in the embodiment of FIGS. 6-8. The region 71 of the sleeve 48 may be a separate member that is welded or otherwise secured to the member 48. The member 44 may be conductive or non-conductive.

Various power supplies may be employed with the heater of the present invention, three being disclosed in assignee's U.S. Pat. Nos. 4,626,767, 4,752,864, 4,769,519 ('519) and 4,795,886 ('886). These latter two patents disclose pulse width modulation schemes wherein the ac current of the pulses is at megahertz frequencies. The frequencies of all of these supplies may be lowered by lowering the local oscillator frequency and making appropriate changes in circuit values such that the supply operates properly. The supply of the '519 patent is preferred since it is the most readily adapted to a lower frequency being the least complex of the supplies cited. Other supplies available in the art may also be used.

Once given the disclosure, many other features, modifications and improvements will become apparent to the skilled artisan. Such other modifications, features and improvements are, therefore, considered a part of this invention, the scope of which is to be determined by the following claims.

What is claimed is:

1. The method of adapting a Curie point self regulating heater for use at frequencies materially lower than that for which it was designed, such Curie point self regulating heater providing a core having a working end, said core having a region displaced from the working end of the core, said core being of a thermally and electrically conductive, paramagnetic material and a layer of about 1.8 to 2 skin depths of ferromagnetic material on an outer surface of the region of the core displaced from the working end and having an effective Curie temperature at approximately the desired temperature of regulation and a coil comprising layers of windings located adjacent said region of the core to excite the ferromagnetic material, the coil designed for operation at a frequency of 13.56 MHz, the method of adaptation to operation at a materially lower frequency comprising increasing the thickness of the layer of ferromagnetic material on said region to a thickness of approximately 2.5 to 3.5 skin depths at a materially lower frequency than 13.56 MHz, increasing the axial length of the coil along said region to achieve an electrical circuit of resistance approximately equal to that of the higher frequency heater, increasing the length of the core to accommodate the increased length of the coil, and increasing the cross-sectional area of the core adjacent the coil to provide adequate heat transfer from the core adjacent the region of the coil most remote from the working end of the core to maintain the heater temperature within a prescribed temperature range for the heater in the presence of varying loads.

2. The method according to claim 1 further comprising enclosing the coil in a closed end sleeve of a ferromagnetic material having a Curie temperature above that of the first-mentioned ferromagnetic material, locating the closed end of the sleeve between the working end of the core and the coil, and providing an opening in the closed end of the sleeve to accommodate said region of the heater.

3. The method according to claim 1, further comprising increasing the current supplied to the coil by approximately 40%.

4. The method according to claim 1 wherein such heater has the coil integral with the core and the heater is located in a handle, further comprising locating the coil in the handle in alignment with the ferromagnetic material upon insertion of the heater in the handle.

5. The method according to claim 1 further comprising extending said region axially from a soldering iron tip constituting the working end of the core.

6. The method according to claim 1 further comprising employing a frequency in the kilohertz range.

7. A Curie point self-regulating soldering iron comprising a tip for the soldering iron with a rearward extension of an electrically and thermally conductive material, a layer of ferromagnetic material on said rearward extension having a thickness of approximately 2.5-3.5 skin depths at the frequency of operation, said ferromagnetic material and said highly conductive rearward extension constituting a heater, an electrically conductive coil for exciting said heater, said coil having a number of turns to produce a system resistance sufficient to rapidly heat said tip to a temperature approaching the effective Curie temperature of said layer consequently reducing the iron's temperature, and a sleeve of ferromagnetic material, an end wall for said sleeve, said end wall disposed between said coil and said tip, substantially in contact with both said coil and said tip and having an aperture to receive said rearward extension.

8. A soldering iron according to claim 7 further comprising a handle for said soldering iron, a forward extension of said handle, said coil being located in said forward extension in an annulus surrounding a centrally axially extending opening in said handle, said rearward extension of said tip being insertable into said handle such as to dispose said heater in radial alignment with said coil.

9. A soldering iron according to claim 8 wherein
said annulus is defined by a ferromagnetic material having an effective Curie temperature sufficiently above the effective Curie temperature of said layer of ferromagnetic material for its magnetic permeability, to be maintained during heating
said rearward extension having a cross-sectional area such that the heat generated in the region of the heater remote from said tip is effective in determining the temperature of said tip.

10. A soldering iron according to claim 7 further comprising
a sleeve of ferromagnetic material having an effective Curie temperature sufficiently above the effective Curie temperature of said layer of ferromagnetic material to maintain its magnetic permeability over the temperature range of operation of said heater,
said sleeve having a closed end with an aperture of sufficient size for said rearward extension to pass through,
said sleeve disposed about said coil and having a Curie temperature such that its permeability remains substantially intact over the temperature range of operation of said heater.

11. A soldering iron according to claim 7 further comprising
a handle for said tip,
said tip having a rearward extension with a connector having leads connected to said coil,
said handle having a multi-contact connector for mating with said multipin connector of said tip,
said tip insertable into said handle,
said tip and said handle having complementary configurations aligning the multipin and multi-contact connectors to insure proper mating thereof.

12. A soldering iron according to claim 11 further comprising
a non-magnetic sleeve enclosing said heater rearwardly of said tip,
an end of said sleeve remote from said tip being configured to retain said multipin connector and shaped to provide alignment in said handle.

13. A soldering iron according to claim 7 further comprising
a source of current in the kilohertz range, and
means for energizing said coli with a current in the kilohertz range.

14. A soldering iron according to claim 7 further comprising
a handle for said tip,
said handle having therein a coil of conductive wire,
said tip insertable into said handle,
means for removably retaining said tip in said handle, and
means for radially aligning said coil and said ferromagnetic material such that magnetic flux generated upon connecting the coil to a source of alternating current is tightly coupled to said ferromagnetic material.

15. A coilless Curie point temperature self regulating soldering iron cartridge adapted to be used with a handle having an induction coil therein, said cartridge comprising:
a heatable tip,
a ferromagnetic material of a desired Curie point disposed on said cartridge rearwardly of said tip,
means disposed on said cartridge to insure alignment of said ferromagnetic material with an induction coil in the handle for energizing said ferromagnetic material to cause its temperature to approach its Curie temperature sufficiently to reduce heating, and
means disposed on said cartridge to permit said cartridge to be securely maintained in alignment with the induction coil.

* * * * *